United States Patent [19]
Kraus

[11] Patent Number: 5,105,731
[45] Date of Patent: Apr. 21, 1992

[54] BLOCKING OF RETURN AIR

[75] Inventor: Willibald Kraus, Grunstadt, Fed. Rep. of Germany

[73] Assignee: TRW United-Carr GmbH & Co., K.G., Enkenbach-Alsenborn, Fed. Rep. of Germany

[21] Appl. No.: 642,475

[22] Filed: Jan. 17, 1991

[30] Foreign Application Priority Data

Jan. 24, 1990 [DE] Fed. Rep. of Germany ....... 4002052

[51] Int. Cl.5 .............................................. B60H 1/26
[52] U.S. Cl. .................................... 454/143; 454/259
[58] Field of Search ................................... 98/2, 2.18

[56] References Cited

U.S. PATENT DOCUMENTS

| | | |
|---|---|---|
| 3,405,968 | 10/1968 | Fetes et al. .......................... 98/2.18 |
| 4,691,623 | 9/1987 | Mizusawa ............................ 98/2.18 |
| 4,781,106 | 11/1988 | Frien .................................... 98/2.18 |

Primary Examiner—Harold Joyce
Attorney, Agent, or Firm—Fay, Sharpe, Beall, Fagan, Minnich & McKee

[57] ABSTRACT

A check valve assembly for the ventilation duct to the passenger space of a motor vehicle comprises an outer housing (3), to which is fastened through at least one clamping connection an inner frame (4). Between the outer housing (3) and inner frame (4) there is clamped at least one check valve element (5) of flexible, soft sheet material. In the rest position, the valve element lies against an oblique grating (11). When air flows, the valve element opens and engages against stays (9). The inner frame (4) is set into the front of the outer housing (3) and the assembled unit comprised of outer housing (3) and closing valve (5) is fastened to a support (2) of the motor vehicle by at least one clip connection (6) arranged on the outer housing (3).

13 Claims, 3 Drawing Sheets

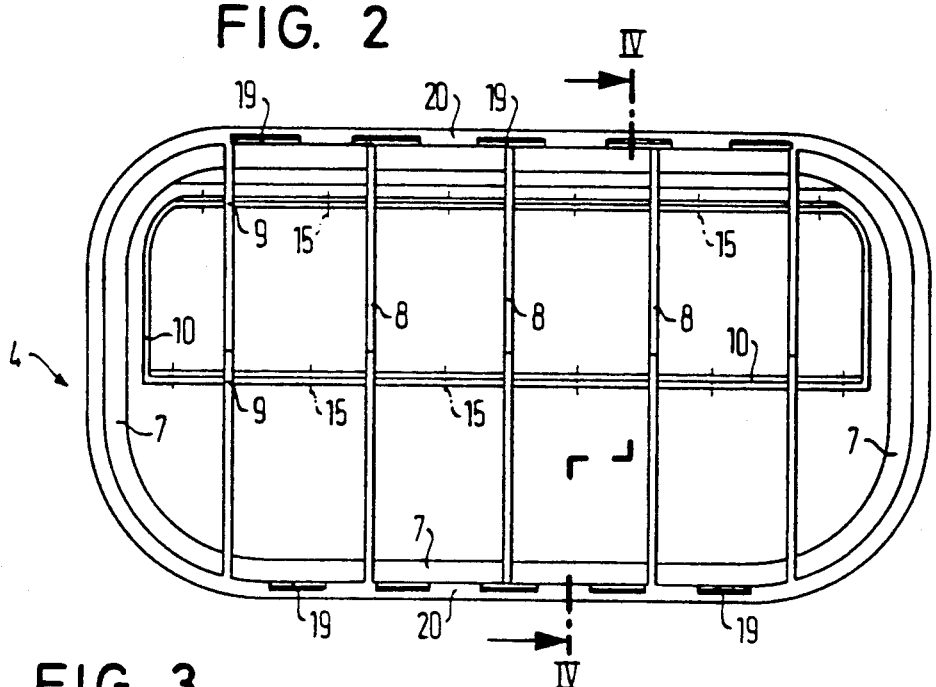
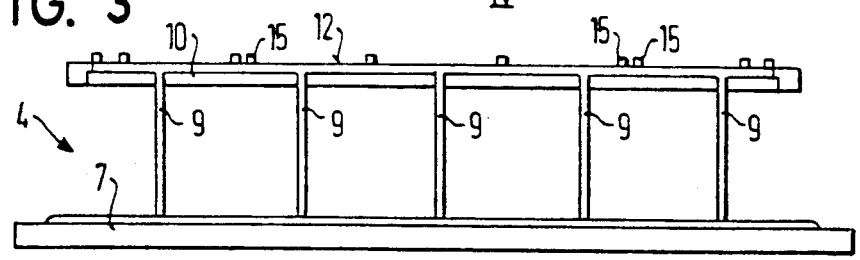
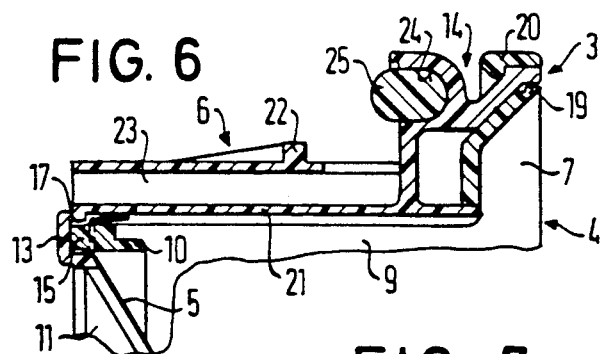
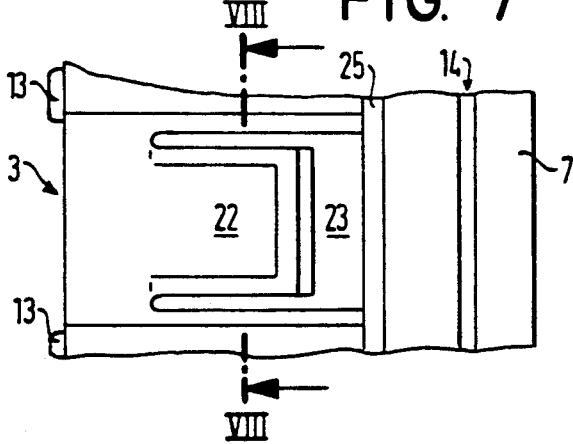
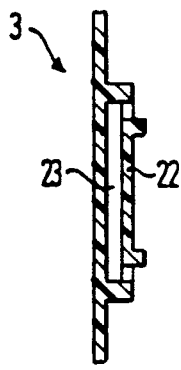

BLOCKING OF RETURN AIR

BACKGROUND OF THE INVENTION

The subject invention relates to a blocking or check valve device for preventing reverse air flow in the ventilation duct leading to the passenger space of a motor vehicle. The device includes an outer housing to which is fastened an inner frame through at least one clamp connection. Between the outer housing and the inner frame there is arranged through a clamping means at least one closing or check valve element formed of flexible, soft fabric-like sheet material. In the closed, or rest position, the sheet lies against an oblique grating. When air flow takes place, the sheet rises to an open position and engages against stay elements.

Already known in the general state of the prior art is an air return check valve or blocking device which comprises an outer housing and an inner frame provided with a closing valve. The known device is designed such that the outer housing and the inner frame are encased one in another while both elements are mutually connected by clip connections. The clip connections of the inner frame serve at the same time for fastening the whole unit into a support opening.

Also known in the state of the prior art is a return air blocking or check valve device intended to be used in motor vehicles and designed such that in order to suppress flutter noises produced by the valve element there are several hook-like stays. The stays are placed so that at the valve element height position at which fluttering begins, the valve touches the free end of at least one of the stays. This is shown in German Disclosure 3,709,244. In this known device, as air flow speed increases, the closing valve collapses in the lower edge zone and is hugged against the stays and held in angular form. This known check valve air return blocking device is connected to the associated motor vehicle support element by glue through a flange and a interposed sealing ring. Thus, in this known construction, disassembly is only possible with great difficulty. Moreover, the hook-like stays do not provide the unit with sufficient stability and rigidity.

A body design for motor vehicles is also known wherein a the ventilation system uses slits with outwardly directed flaps and corresponding hook-like surfaces. This is shown in German Disclosure 3,240,290. This known construction, however, constitutes an integral component of a vehicle body and cannot be mounted or placed onto the vehicle as a premounted unit.

BRIEF STATEMENT OF THE INVENTION

On the other hand, the present invention attacks the problem of designing such a return air blocking or check valve structure of the type mentioned so that in a very simple way, a rapid and cost-saving mounting is produced and reliability of operation is fully retained. According to the subject invention, the problem is solved by the fact that the assembly includes an inner frame that is set at its front end into an outer housing. The assembly is arranged such that the entire unit comprised of an inner frame, an outer housing, and a closing valve element is fastened to the motor vehicle support structure by at least one clip connection arranged on the outer housing. In this way, there is the advantage that the stable outer housing is used for the fastening of the whole unit in the support opening and the inner frame can thus be built simpler and lighter.

In a further embodiment of the invention, the inner frame has a circumferential rim with transversely extending ridges on which are arranged the outwardly extending stays. The stays are connected with each other by a circumferential frame. In this construction, there results a stable unit of the inner frame since by the corresponding stays, two spaced zones of the inner frame are mutually joined.

According to another feature of the subject invention, oblique screen or grating elements are arranged on the outer housing and the end surfaces of the circumferential frame of the inner frame. A closing zone of the oblique grating forms the clamping means for the flexible valve sheet. In this embodiment, the end surface of the circumferential frame of the inner frame has outwardly extending spaced pins which in the installed condition penetrate the rim or edge zone of the flexible valve sheet. The ends of the pins lodge in suitable openings formed in the oblique grid of the outer housing. Thus, the edge or rim zones of the flexible closing valve sheet is clamped in a functionally secure manner between the inner frame and the outer housing. Because of the pins and their engagement in the openings in the oblique grid, the edge of the valve sheet is assured of having the requisite immobility.

In a further embodiment of the invention, the outer housing has a surrounding outer rim with clamp connections for fastening to opposed elements of the surrounding rim of the inner frame. As explained above, in this way, the fastening of the outer housing with the inner frame provides a premounted unit for fastening to the corresponding support of the motor vehicle. Moreover, the outer housing has a surrounding wall which adjoins the surrounding rim. On the end of the surrounding wall, there is formed the oblique grid. The upper side of the surrounding wall is provided with at least one resilient tongue directed against the support to act as a clip connection. This allows the premounted unit to be placed from one end into a correspondingly formed and shaped opening of a vehicle support. The at least one springy tongue of the check valve assembly is arranged to enter into a recess opening in the surrounding wall. Moreover, the surrounding rim of the outer housing in another embodiment of the invention is provided with a groove directed toward the springy tongue to receive a sealing ring formed from a suitable material, such as polyurethane foam. In another form of the invention, the springy tongue is arranged on a locking device which, in turn, can be connected with the outer housing.

BRIEF DESCRIPTION OF THE DRAWINGS

The above and other objects of the invention will be explained subsequently in conjunction with specific examples of the invention represented in the drawings wherein:

FIG. 2 is a front view of the inner frame structure used in the FIG. 1 embodiment;

FIG. 3 is a bottom view of the inner frame structure shown in FIG. 2;

FIG. 6 is a cross-sectional view of a part of the outer housing and the inner frame (the components are partially broken away to more clearly illustrate certain features of the construction);

FIG. 7 is a top view of the embodiment of FIG. 6;

FIG. 8 is a cross-sectional view taken on line VIII—VIII in FIG. 7;

DETAILED DESCRIPTION OF THE PREFERRED EMBODIMENT

Figure 1:
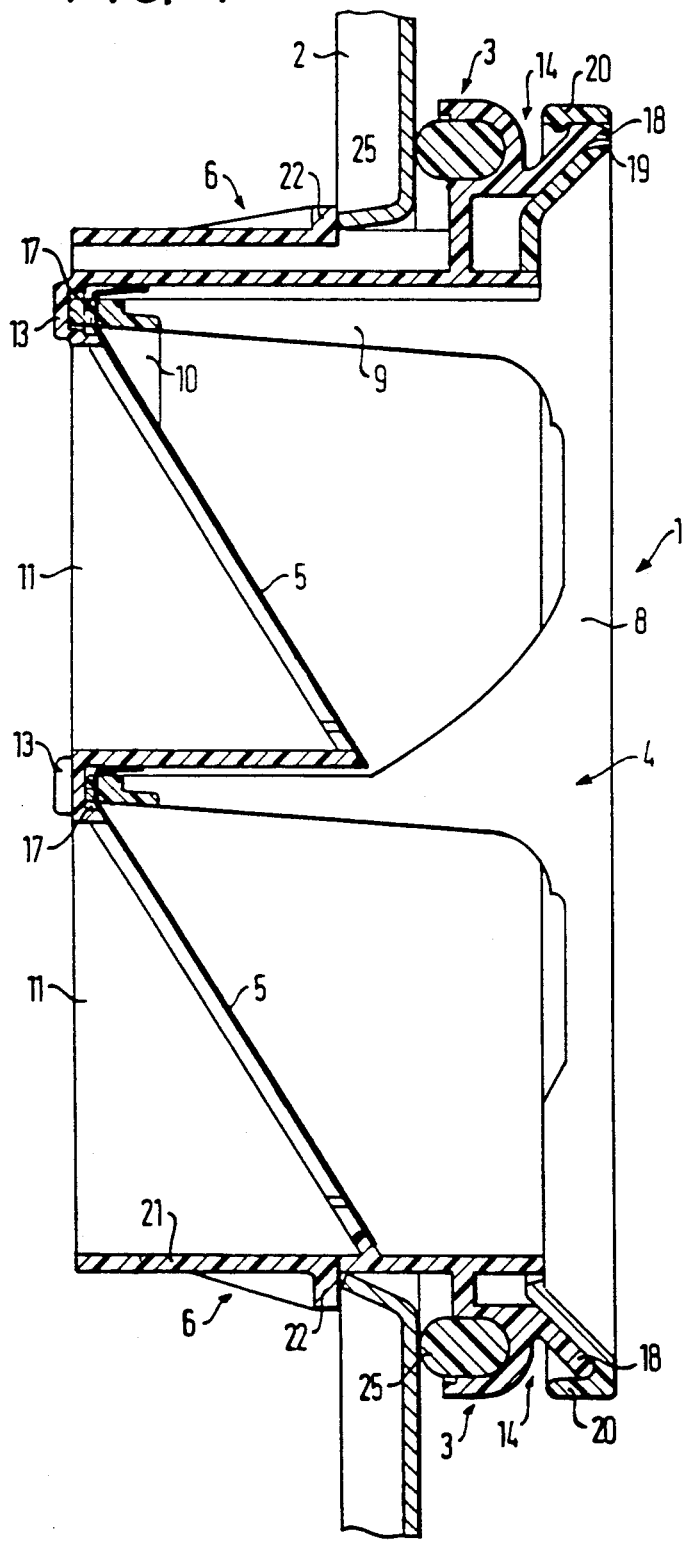
FIG. 1 is a cross-sectional view through the check valve structure formed in accordance with the preferred embodiment of the invention (FIG. 1 shows the structure in an installed condition in the vehicle)

Referring more particularly to the drawings wherein the showings are the purpose of illustrating a preferred embodiment of the invention only and not for the purpose of limiting same, FIG. 1 illustrates a check valve structure 1 particularly intended for use in the ventilation air supply duct for the passenger space of a motor vehicle. The assembly generally comprises a stable and relatively rigid outer housing 3 to which is fastened through at least one clamping device 18, 19 a thin and somewhat more light weight inner frame assembly 4. Between the outer housing 3 and the inner frame 4 there are arranged, one above the other, a pair of check valve elements 5. The elements 5 are formed of a flexible, somewhat resilient and elastic soft sheet material, such as suitable plastic or fabric sheeting. The individual sheets are fastened by clamping means in the closing zone or clamping area 13 between the outer housing 3 and the inner frame 4. In the FIG. 1 showing, the closing check valve elements are in a closed position and lie by their own weight under the force of gravity against an oblique grid 11 formed on the outer housing 3. When air is entering through the assembly from the direction of the arrow, the individual valve elements 5 are deflected upwardly and lifted away from the oblique grid into engagement with the generally horizontally extending stays or ribs 9 of the inner frame 4.

As can be seen from FIG. 1, the front end of the inner frame 4 sets into the outer housing 3. The entire assembled unit comprised of the inner frame 4, outer housing 3, and the closing or check valve elements 5 is fastened to a support element or panel 2 of a motor vehicle (not shown in detail) by at least one clip connection 6 carried and arranged on the outer housing 3.

Figure 4:
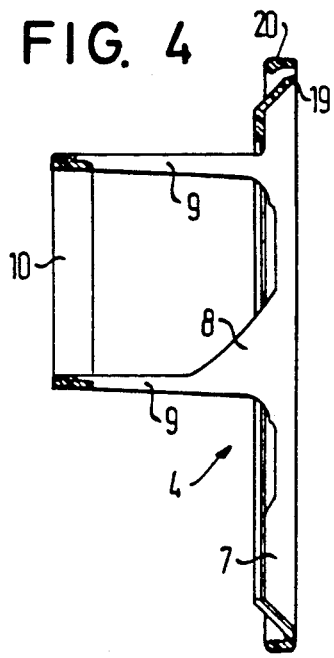
FIG. 4 is a cross-sectional view taken on line IV—IV of FIG. 2.

From FIGS. 2 through 4, it can be seen that the inner frame 4 has a surrounding peripheral rim 7 which is continuous and carries transverse rib or web members 8 at laterally spaced locations as best illustrated in FIGS. 2 and 3. Extending outwardly from the ribs 8 are a plurality of stays or support elements 9. The outer ends of the stays 9 are adjoined to each other and rigidified by a surrounding, generally continuous frame element 10. The frame element 10 can be joined to the ends of the stays 9 in any convenient manner and preferably has the general cross-sectional shape best illustrated in FIG. 6. With the arrangement described, the inner frame 4, in spite of its relatively thin, light weight construction is, as a whole, a stable construction unit.

Figure 5:
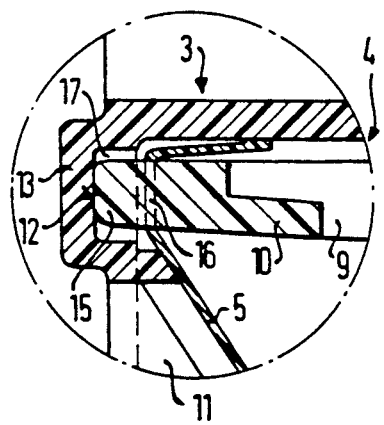
FIG. 5 is an enlarged view of the fastening zone for the flexible elastic closing valve elements.

As best illustrated in FIGS. 2 and 3, the end surfaces 12 of the surrounding end frame 10 of the inner frame 4 carry pins 15 which are spaced from each other and extend outwardly only a short distance from the surface 12. These pins 15 serve to penetrate through the rim zone 16 of the closing or check valve elements 5 when the valve element is placed in an installed condition as illustrated in FIGS. 4 and 5. In the installed condition, the ends of the pins 15 lodge in the blind holes or recess openings 17 of the closing zone 13 of the oblique grid 11 of the outer housing 3. In this manner, the edge of the individual sheet-like check valve elements is firmly retained and clamped in its desired located position along the upper edge of each of the inclined grid sections.

As best illustrated in FIGS. 1 and 6, the outer housing 3 has, in turn, a surrounding rim 14 with a clamp connection 18 for joining it and suitably fastening it to opposed elements 19 of the surrounding circumferentially continuous rim 20 of the inner frame 4. The clamping connection 18 and the opposed elements 19 are designed such that the outer housing 3 has resilient tongue-like elements which are supported on pocket-like openings which are provided with locking edges in the inner frame 4. The inner frame 4 thus snaps into position and the connections 18 suitably engage to resiliently latch behind the locking edges carried on the surrounding rim 20. It can also be seen from FIG. 1 that the oblique grid is arranged on the outer housing 3. The end surfaces of the surrounding frame 10 of the inner frame 4, as mentioned above, together with the closing zone 13 of the oblique grid 11 form the clamping means for the check valve elements 5.

According to FIGS. 1 and 6, the outer housing 3 has a surrounding wall 21 which lies against the surrounding rim on the end of which the oblique grid 11 is formed. The outer end of the surrounding wall 21 is provided with at least one springy tongue which serves as a clipped connection and is directed toward the support 2. From FIG. 7 and 8, it can be seen that the at least one springy tongue 22 is arranged in a pocket-like zone 23 of the surrounding wall 21. Thus, the springy tongue 22 can pivot or spring freely within the pocket-like zone 23 and can lie, accordingly, against the neighboring wall of the support 2. This, as can be seen from FIG. 1, takes place and can function independently of any cooperation of the inner frame 4. Thus, for example, the outer housing 3 may, by itself, be fastened into the vehicle support opening without the inner frame 4 being present. It may also be seen from FIG. 1 and 6 that the surrounding rim 14 of the outer housing 3 includes a surrounding or circumferentially extending groove 24 which generally faces toward the springy and resilient tongues 22. The groove 24 functions to receive a sealing ring or gasket member 25 which engages with the wall of the vehicle support in the area surrounding the opening and to which the assembly is mounted. The sealing ring 25 can be any suitable resilient gasket material such as, for example, a foamed polyurethane or the like.

The entire assembled check valve unit comprising the outer housing 1, inner frame 4, and the closing or check valve elements 5 is premounted with the rim zone 16 (see FIG. 5) of the individual valve elements 5 is penetrated by the pins 15 of the inner frame 4. The pins 15, as previously mentioned, lodge in opening 17 of the closing zone or area 13 of the outer housing 3. Thus, the check valve elements 5 are clamped securely between the inner frame 4 and the outer housing 3. As can be seen from FIG. 1, the elements 5 lie against the corresponding elements of the oblique grid 11 of the outer housing 3. With the entire unit so premounted, it is assembled into the vehicle opening by being pushed from right to left. The clip connections 6 with the springy tongues 22 of the stable outer housing spring back over the corresponding diagonal until they lie against the corresponding wall of the vehicle support 2. Of course, the tongues 22 snap into this position and retain this location. In this assembled condition, the polyurethane sealing ring 25 engages and compresses against the outer wall of the support 2. Thus, there is provided a proper and complete seal about the opening 2.

Because the outer housing 3 assures the holding of the entire assembled unit against the opening of the support 2 of the motor vehicle, there is a significant cost saving in the design of the entire check valve assembly 1.

Figure 9:
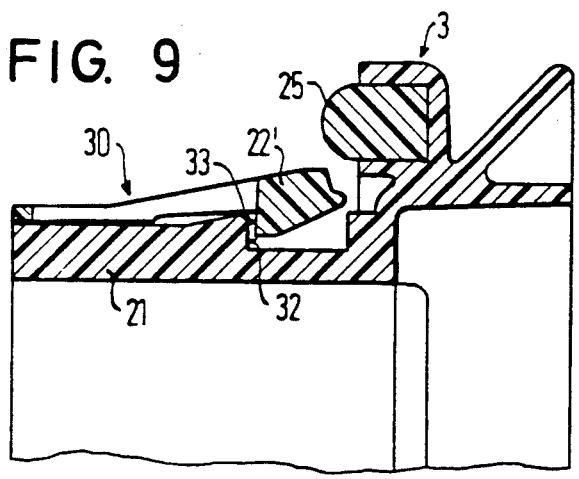
FIG. 9 shows another form of the invention (the view is taken along line IX—IX of FIG. 10)
Figure 10:
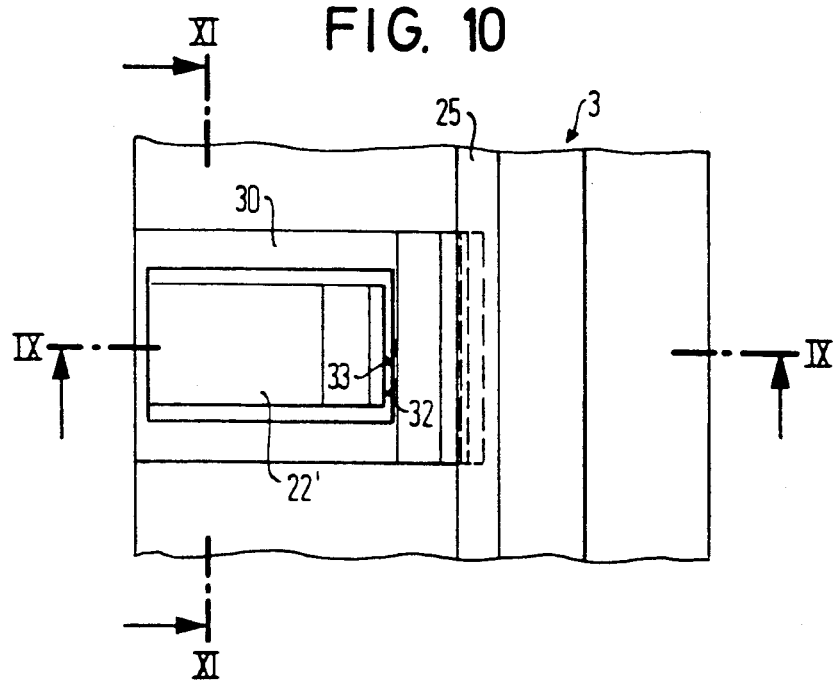
FIG. 10 is a top plan view of the embodiment according to FIG. 9.
Figure 11:
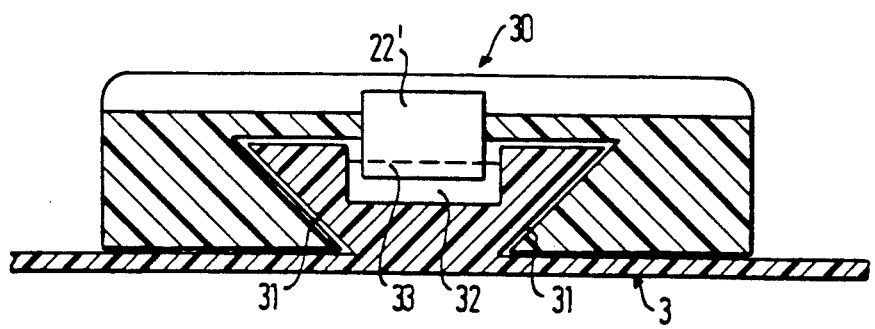
FIG. 11 is a cross-sectional view taken along the line XI—XI in FIG. 10.

According to further embodiment of the invention, it is possible, as shown in FIGS. 9 to 11, for the springy resilient tongue 22' to be made separately as an independent piece relative to the outer housing 3. For this embodiment, the tongue 22' may be arranged an supported on a locking element 30 which can be connected with the outer housing 3. The locking element 30 is guided in its movement through a dove-tail guide 31 on the outer surface of the housing 3 in the zone of the surrounding wall 21.

The locking element 30 may also have a gripping edge 33 to engage behind a stop surface 32 of the outer housing 3. From FIG. 10', it can be seen also that the springy tongue 22' lies in the middle zone of the locking element 30 between the surfaces of the dove-tail guide 21. This locking element is moved into position by being pushed in over the dove-tail guide on the wall 21. It is pushed in until, as seen in FIG. 9, the edge 33 grips behind a stop surface 32 on the outer housing 3.

With the completion of the above steps, the locking element 30 is secured on the surrounding wall 21 of the outer housing 3. If the assembled unit is mounted on a wall in the manner shown in FIG. 1, the front zone of the springy tongue 22' (as in the form according to FIG. 1) can strike against the support 2. Thus, in this form of construction and in a simple way, a functionally secure fastening of the whole unit to a support 2 is assured.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. In a check valve assembly in association with the ventilation system for the passenger space of a motor vehicle, said assembly comprising an outer housing to which an inner frame is connected with a check valve element formed of flexible sheet material clamped between the outer housing and the inner frame, the improvement wherein the inner frame (4) is received into an open end of the outer housing (3) and the assembled unit comprising the inner frame (4), the outer housing (3), and the check valve element (3) is joined to a support (2) of the motor vehicle through a resilient clip connection (6) carried on the outer housing (3); and,
wherein the inner frame (4) has a surrounding rim (7) carrying rib members (8) spaced transversely with stays (9) extending therefrom and a surrounding frame (10) joining the stays (9).

2. The assembly as defined in claim 1 wherein an oblique grid (11) is arranged on the outer housing (3) and end surfaces (12) of the surrounding frame (10) and a closing zone (13) of the oblique grid (11) form the clamp for the check valve element.

3. The assembly as defined in claim 2 wherein the end surfaces (12) carry pins (16) spaced from one another and penetrating through a rim zone (16) of the check valve element into lodged position in openings (17) formed in the oblique grid (11).

4. The assembly as defined in claim 1 wherein the outer housing (3) has a surrounding rim (14) with a clamping connection means (18) for fastening to the surrounding rim (7) of the inner frame (4).

5. The assembly as defined in claim 2 wherein the outer housing (3) has a surrounding rim (14) and a surrounding wall (21) on the end of which is formed the oblique grid (11).

6. The assembly as defined in claim 5 wherein the surrounding wall (21) has an upper side provided with at least one springly tongue (22, 22') directed toward the support (2) and functioning as the clip connection (6).

7. The assembly as defined in claim 6 wherein the at least one springy tongue (22) is carried by the surrounding wall (21).

8. The assembly as defined in claim 7 wherein the surrounding rim (14) of the outer housing (3) has a surrounding groove (24) directed toward the at least one spring tongue (22), said groove (24) carrying a sealing ring (25).

9. The assembly as defined in claim 1 wherein the clip connection (6) comprises a springy tongue (22') formed separate from the outer housing (3).

10. The assembly as defined in claim 9 wherein the springy tongue (22') is carried on a locking element (30) which is connected with the outer housing (3).

11. In a check valve assembly in association with the ventilation system for the passenger space of a motor vehicle, said assembly comprising an outer housing to which an inner frame is connected with a check valve element formed of flexible sheet material clamped between the outer housing and the inner frame, the improvement wherein the inner frame (4) is received into an open end of the outer housing (3) and the assembled unit comprising the inner frame (4), the outer housing (3), and the check valve (3) is joined to a support (2) of the motor vehicle through a resilient clip connection (6) carried on the outer housing (3); and,
wherein the clip connection (6) comprises a springy tongue (22') formed separate from the outer housing (3), said springy tongue (22') being arranged on a locking element (30) which can be connected with the outer housing (3), and said locking element (30) being guided over a dovetail guide (31) on the outer surface of the outer housing (3).

12. The assembly as defined in claim 11 wherein the springy tongue (22') has a gripping edge (33) which engages a stop surface (32) on the outer housing (3).

13. The assembly as defined in claim 12 wherein the springy tongue (22') is centrally located on the locking element (30).

* * * * *